July 11, 1967 W. H. TSCHANTZ 3,330,319
FROZEN MEAT BLOCK CHIPPING APPARATUS
Filed Dec. 3, 1965 3 Sheets-Sheet 1
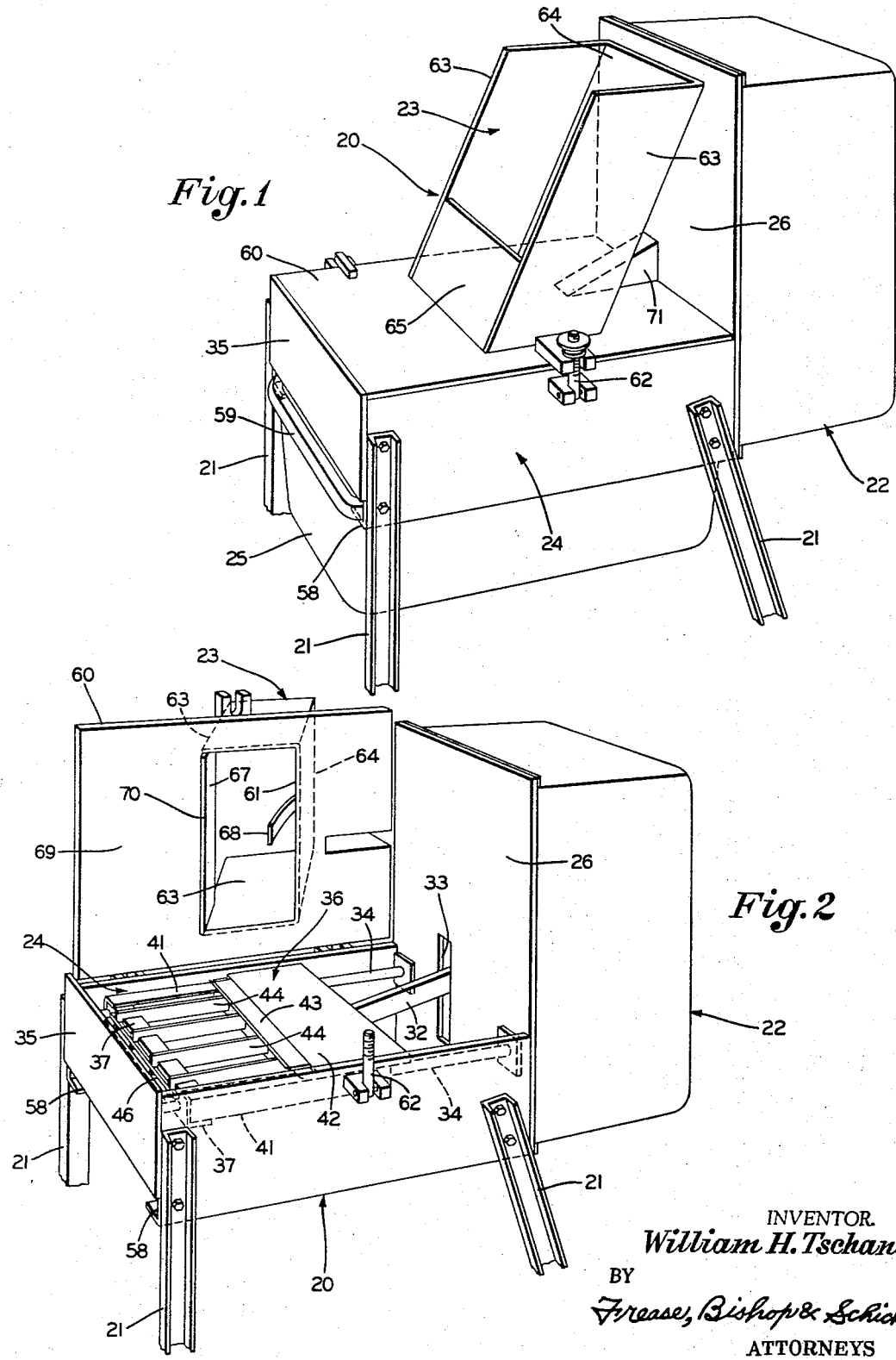
INVENTOR.
William H. Tschantz
BY
Frease, Bishop & Schick
ATTORNEYS July 11, 1967 W. H. TSCHANTZ 3,330,319
FROZEN MEAT BLOCK CHIPPING APPARATUS
Filed Dec. 3, 1965 3 Sheets-Sheet 2
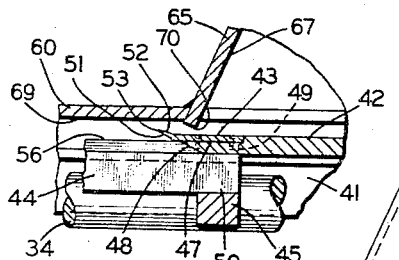
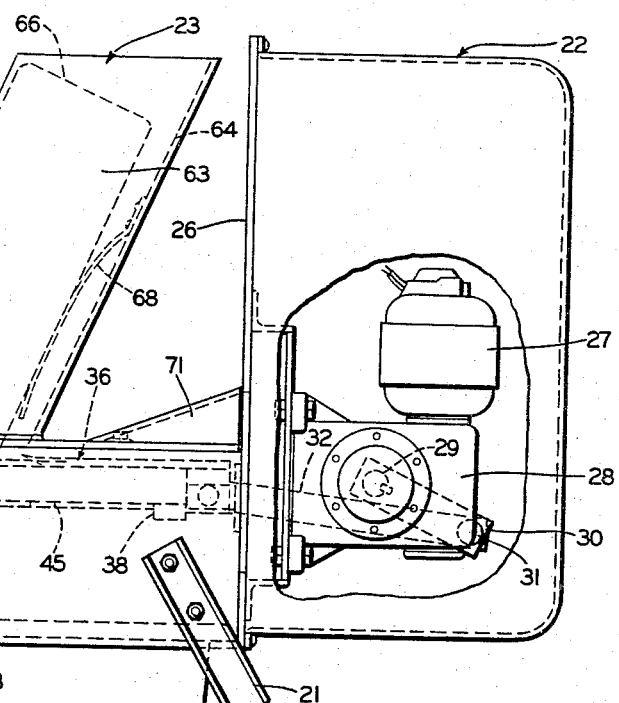
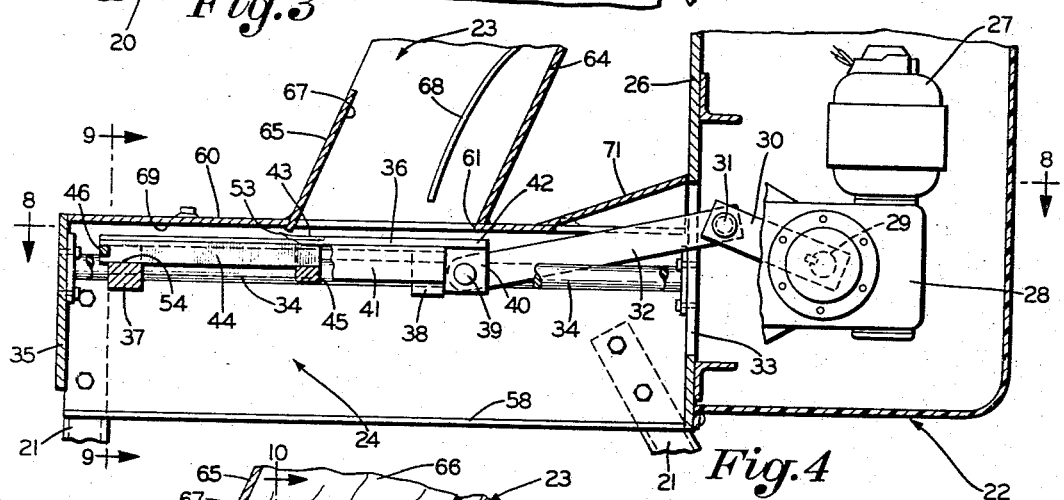
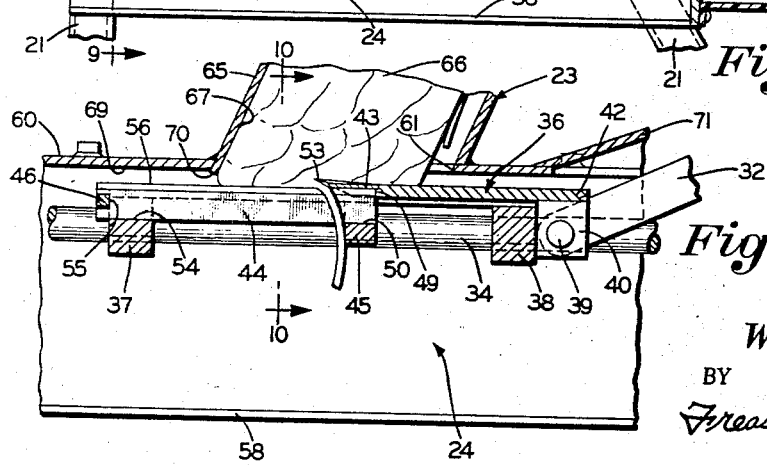
INVENTOR.
William H. Tschantz
BY
Frease, Bishop & Schick
ATTORNEYS

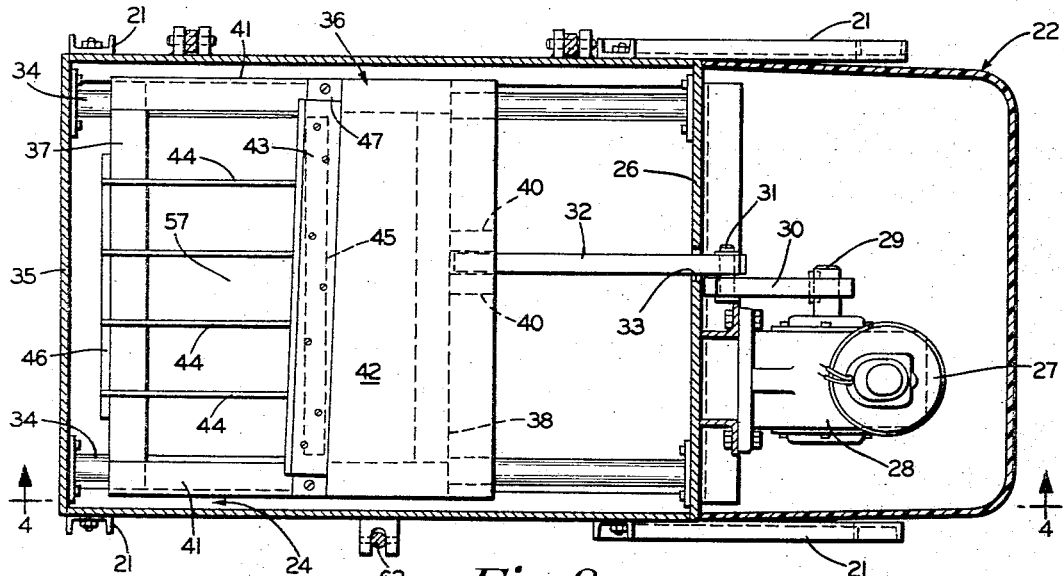

United States Patent Office 3,330,319
Patented July 11, 1967

3,330,319
FROZEN MEAT BLOCK CHIPPING APPARATUS
William H. Tschantz, R.D. 1, Kensington, Ohio 44677
Filed Dec. 3, 1965, Ser. No. 511,432
5 Claims. (Cl. 146—151)

ABSTRACT OF THE DISCLOSURE

A machine for chipping blocks of frozen meat having a hopper from which frozen meat blocks are self-fed at an acute angle to reciprocating angular and longitudinally extending cutting members which cut the block into slices and sever the slices into smaller chips of meat in frozen condition.

---

This application is a continuation-in-part of my copending U.S. Application, Ser. No. 411,965, filed November 6, 1964, and entitled "Frozen Meat Block Chipping Apparatus."

The invention relates to the processing of frozen meat, and more particularly to apparatus for chipping into frozen or semi-frozen meat chips or shavings, blocks of frozen and semi-frozen meat without appreciable thawing, or sawing or chopping the frozen blocks, and without meat or fluid loss from the block content, so that the frozen meat chips or shavings produced may be ground or otherwise processed in usual meat grinders to form ground meat rapidly and at minimum cost of conversion of the meat from frozen block to ground condition.

Meat in the past has been and now normally is processed in meat markets in refrigerated but unfrozen condition to convert the meat to the cuts or condition desired by the purchaser. Mechanized equipment such as saws, grinders, slicers, choppers, etc. have been designed in operation primarily to handle or prepare meat in unfrozen condition, although saws frequently are used to cut or prepare roasts, chops, steaks, etc. from frozen sides or sections of meat which normally include bones.

However, equipment and procedures for processing meat in unfrozen condition is inefficient and wasteful when used generally to process or prepare frozen meat. In many instances, entirely new or different procedures and equipment are required for preparing frozen meat. Thus, any meat market whether large or small is faced with a problem where frozen and unfrozen meats both must be handled, prepared, or processed, as to how such equipment of different types can be justified economically for handling meat in both conditions.

In recent years, beef in frozen block form, usually blocks, say, 4″ x 12″ x 16″ to 7″ x 15″ x 21″, has been imported from foreign countries and distributed to meat markets in frozen condition. The blocks are maintained frozen at the meat market until being prepared for retail sale as hamburger by the pound or packaged for supermarket counter display.

It is impractical to thaw such meat from the frozen block condition before grinding into hamburger, except for immediate sale of the entire thawed quantity, because the thawed meat will lose its bloom and have too short a case life for practical extended counter or case display or storage in bulk or in packaged ground condition. Further, some loss of fluid content accompanies thawing of meat from frozen block condition.

In order to delay the loss of bloom and to increase the case life of hamburger ground from beef in frozen block condition, the meat should be ground while being retained substantially in frozen condition.

These considerations in the past have dictated that beef in frozen block form when being converted to hamburger normally is sawed in the frozen state into small enough chunks, cubes, slices, fragments or sticks that such chunks, cubes, slices, fragments or sticks in frozen condition can be fed to and ground in usual meat grinders for conversion into hamburger.

This procedure involves several difficulties including considerable expense and waste. First of all, normally there is a loss of approximately 2 pounds of beef in the sawdust produced in sawing say a 60 pound frozen beef block into small enough portions to be ground in the usual grinder.

Next, the sawing operations are very time-consuming, thereby substantially increasing the time and labor cost factors in the cost of hamburger produced.

Next, wear and tear on grinding equipment is considerable due to the frozen condition of the relatively large chunks of frozen meat ground. If such chunks are sawed to be smaller in size to reduce the grinder load, then the losses in sawdust, time of sawing, etc. are increased.

This, in effect, requires the grinders to have a heavier, sturdier and more rugged construction where substantial amounts of meat in frozen block form are to be ground, thus increasing overall equipment costs.

Furthermore, the grinding of meat in usual grinders in frozen stick form is quite dangerous for the operator. This stick must be pushed forcefully into the grinder receiving hopper so that the lower frozen end is engaged by the grinding element. Frequently the grinding element grabs the frozen stick and whips it against the operator, injuring the operator.

These considerations indicate the ultimate existing problem of economic waste involved in the conversion of meat, primarily beef, from frozen block form to ground condition. This economic waste is considerable. It has been estimated by one chain of stores that the chain has a $2,000.00 per day conversion cost from meat loss and time, labor and equipment costs, in connection with the conversion of beef in frozen block condition to hamburger in condition to be packaged for counter display and sale.

The embodiment of the frozen meat block chipping apparatus disclosed in my copending application referred to above has provided an efficient solution to the foregoing problems in many cases and under certain conditions, and particularly where the meat blocks are processed in a relatively hard frozen state. There are certain situations, however, and particularly where the meat block has been stored for more than several days in the usual meat cooler, in which a slight thawing of the frozen meat block begins to take place, and this presents additional problems in accomplishing the chipping operation. There are also additional problems presented by the fact that the meat forming the meat block may contain tendons and strings which may not be as easily severed, again particularly in a semifrozen state.

Accordingly, it is a general object of the present invention to provide new apparatus and procedures for converting beef in frozen and semifrozen block form into frozen and semifrozen chips or shavings which can be directly ground into hamburger without loss of bloom, without decreasing case life, without meat loss, without substantial labor, and in substantially less time than heretofore has been required to convert frozen and semifrozen beef to hamburger in accordance with prior practice.

Also, it is an object of the present invention to provide new apparatus for chipping into chips or shavings of frozen and semifrozen meat, meat in frozen and semifrozen block form whereby the chips or shavings of frozen meat produced may be readily ground or otherwise processed in frozen condition in usual meat grinders without meat loss and in the same manner that unfrozen meat is ground in such meat grinders, without damage or unusual stress to the meat grinder, and without the hazard of injury to the operator that is present when frozen sticks are ground.

Moreover, it is an object of the present invention to provide new apparatus and procedures for converting meat from frozen and semifrozen block to ground condition rapidly and at minimum cost of conversion.

Also, it is an object of the present invention to provide new apparatus and procedures for converting meat from frozen and semifrozen block to ground condition which eliminates the time and expense of sawing, eliminates the loss of meat as sawdust produced by sawing operations, and eliminates the added load on, wear and tear on and special strength requirements for meat grinders arising when chunks of frozen meat are required to be ground.

Moreover, it is an object of the present invention to provide new apparatus for converting frozen and semifrozen meat from frozen and semifrozen block to ground condition which can handle frozen blocks of meat having a large range of block sizes.

Further, it is an object of the present invention to provide new meat chipping apparatus for chipping or shaving meat in frozen and semifrozen block condition which may be operated safely and which may be readily cleaned and maintained in a sanitary condition.

In addition, it is an object of the present invention to provide new apparatus and procedures for converting meat from frozen and semifrozen block to ground condition which in use results in a major reduction in conversion costs, thus essentially eliminating the economic waste problem heretofore existing.

Finally, it is an object of the present invention to provide new frozen meat block chipping apparatus and procedures which eliminate difficulties heretofore encountered in the art of handling and processing meat; which eliminate economic waste that in the past has characterized the conversion of meat from frozen and semifrozen to ground condition; which achieve the indicated objects in a simple, effective and low cost manner; and which solve problems and satisfy needs existing in the art.

These and other objects are accomplished by the parts, constructions, methods, arrangements, combinations and subcombinations comprising the present invention, a preferred embodiment of which—illustrative of the best mode in which applicant has contemplated applying the principles—is set forth in the following description and illustrated in the accompanying drawings, and which is particularly and distinctly pointed out and set forth in the appended apparatus and method claims forming a part hereof.

In general terms, the invention of the present application involves the cutting of substantially frozen and semifrozen meat blocks, and the preferred embodiment of the apparatus involves the holding of a substantially frozen meat block presented for having substantially frozen meat chips cut from an end thereof, passing a knife blade cutting edge through the meat block and across this end while, at the same time, forcing the meat chip severed from the meat block end against a series of runner blades positioned spaced across the path of travel of the knife blade and extending in the direction of the path of travel of the knife blade. This results not only in the larger meat chip being cut in frozen and semifrozen state from across the end of the meat block, but also results in this larger meat chip being simultaneously cut into smaller frozen and semi-frozen meat chips.

By way of example, the preferred embodiment of the improved frozen meat block chipping apparatus of the present invention for carrying out the methods of the present invention is shown in the accompanying drawings forming a part hereof, wherein like numerals indicate similar parts throughout the several views, and in which:

FIG. 1 is a fragmentary side perspective view showing the over-all apparatus in operational position and with a meat chip receiving container positioned therebeneath;

FIG. 2, a view similar to FIG. 1 but with the top cover in open position exposing the knife plate and with the meat chip receiving container removed;

FIG. 3, an enlarged fragmentary side elevation, with parts broken away, exposing internal parts of the apparatus of FIG. 1;

FIG. 4 is a vertical sectional view, part in elevation and with parts broken away, looking in the direction of the arrows 4—4 in FIG. 8;

FIG. 5, an enlarged fragmentary sectional view taken directly from FIG. 4, but enlarged to more clearly show details;

FIG. 6, an enlarged fragmentary sectional view similar to a part of FIG. 4, but with the knife plate approximately midway in the knife plate cutting stroke and in the process of severing meat chips from a frozen meat block;

FIG. 7, a view similar to FIG. 6, but with the cutting plate at maximum rearward position and ready for a forward cutting stroke;

FIG. 8, a sectional view, part in elevation, looking in the direction of the arrows 8—8 in FIG. 4;

FIG. 9, a fragmentary sectional view, part in elevation, looking in the direction of the arrows 9—9 in FIG. 4;

FIG. 10, a fragmentary sectional view, part in elevation, looking in the direction of the arrows 10—10 in FIG. 6; and FIG. 11, a side perspective view of one of the runner members removed from the knife plate.

An embodiment of the frozen meat block chip apparatus according to the principles of the present invention is shown in FIGS. 1 and 2, FIG. 1 in closed position ready for operation and FIG. 2 in an open position exposing part of the internal mechanism. As shown, this apparatus includes a support frame, generally indicated at 20, supported on usual leg members 21 and forming a drive chamber, generally indicated at 22, a feed hopper, generally indicated at 23, and a cutting chamber, generally indicated at 24, with a meat chip container 25 being removably supported beneath the cutting chamber 24 and between the leg members 21.

The overall construction of the apparatus is generally rectangular in configuration with the drive chamber 22 having a front wall 26, as shown in FIGS. 3, 4 and 8, mounting a usual combination electric drive motor 27 and gear reduction unit 28, so that the drive shaft 29 extends laterally, and rotatably mounts one end of a crank arm 30 rotatable in a vertical plane extending forwardly and rearwardly. The outer end of the crank arm 30 is in turn pivotally connected through a pivot pin 31 to the rearward end of a pitman arm 32.

The pitman arm 32 extends forwardly through a slot 33 in the drive chamber front wall 26 so that the forward end of this arm projects into the cutting chamber 24. Thus, with this crank arm 30 and pitman arm 32 arrangement, operation of the drive motor 27 for rotating the drive shaft 29 of gear reduction unit 28 causes forward and rearward reciprocation of the forward end of the pitman arm 32.

The cutting chamber 24 encloses a pair of laterally spaced and forwardly and rearwardly, or longitudinally extending slide rods 34, which slide rods preferably extend generally horizontally. The rearward ends of these slide rods 34 are secured to the drive chamber front wall 26 and the forward ends thereof to the cutting chamber front wall 35. As shown in FIGS. 2 through 10, a rigid knife plate, generally indicated at 36, is forwardly and rearwardly, or longitudinally reciprocally mounted on the slide rods 34 through the front bearing bar 37 and rear bearing bar 38. The rear bearing bar 38 is, in turn, pivotally connected to the forward end of the previously described pitman arm 32 by means of a drive pin 39 received laterally through the forward end of the pitman arm and between a pair of laterally spaced connecting plates 40 secured to at least the rear bearing bar 38.

The knife plate 36 includes the generally inverted L-shaped cross-section side members 41, the blade mounting plate 42, the knife blade 43, the runners 44, the rear runner mounting bar 45, and the front runner mounting key 46. As shown, the side members 41 tie together the entire assembly of the knife plate 36, with these side members extending longitudinally along the sides of and longitudinally between the front and rear bearing bars 37 and 38 determining the lateral extremities of the knife plate 36.

The blade mounting plate 42 is mounted over the side members 41 extending generally horizontally and laterally between these side members, with the rearward end portion of the blade mounting plate overlying the rear bearing bar 38 and connecting plates 40. The forward end of the blade mounting plate 42 terminates forwardly intermediate the front and rear bearing bars 37 and 38, with this front portion including the upper knife blade cut-out 47, the front downwardly-rearwardly tapered surface 48 and the laterally spaced, longitudinally extending runner slots 49, these latter slots probably being best seen in FIGS. 6, 7 and 10.

The rear runner mounting bar 45 is secured underlying the front portion of this blade mounting plate 42 with mounting bar 45 extending laterally between and spaced inwardly from the slide rods 34, as best seen in FIG. 10. Also, this rear runner mounting bar 45 is formed with laterally spaced runner slots 50 extending longitudinally therethrough and opening upwardly into alignment with the runner slots 49 in the lower surface of the blade mounting plate 42.

The knife blade 43 is removably secured in the knife blade cut-out 47 of the blade mounting plate 42 and projects forwardly of the front extremity of this mounting plate. Furthermore, knife blade 43, spaced forwardly of the blade mounting plate 42, is formed with a front, downwardly-rearwardly tapered surface 51 and an upper, ground rake 52, to form the cutting knife edge 53 spaced above the upper surface of the blade mounting plate 42, as shown.

It is preferred that the cutting knife edge 53 of knife blade 43, although extending generally laterally, will not extend exactly laterally across the front of the knife blade and the blade mounting plate 42, that is, not exactly at right angles or 90° to longitudinal, or the forward and rearward reciprocating movement of the knife plate 36 as determined by the slide rods 34. Rather, it is preferred that the cutting knife edge 53 will extend at an angle at least a few degrees or more different from exactly lateral or 90° to longitudinal.

The purpose of this is so that when the knife blade 43 is cutting frozen and semi-frozen meat, at the beginning of the cut, the cutting knife edge 53 will enter the meat being cut progressively rather than the entire edge at once, thereby, requiring less driving power to initiate and continue the cut. On the other hand, the degree of difference from straight lateral is determined as a practical matter from the total length of cutting stroke of the knife plate 36 that can be tolerated and still mainain the size of the over-all mechanism within practical limits, since the greater the degree difference from exactly lateral of this cutting knife edge 53, the greater longitudinal length of cutting stroke required for the knife plate 36.

The front bearing bar 37 is also formed with a series of laterally spaced longitudinally extending runner slots 54 which open upwardly and are longitudinally aligned with and equal in number to the runner slots 49 in the blade mounting plate 42 and the runner slots 50 in the rear runner mounting bar 45. The runners 44 are received one each in each aligned set of these runner slots 49, 50 and 54, so that these runners are positioned upstanding, laterally spaced, and extending longitudinally between the front bearing bar 37 and rear runner mounting bar 45. The rearward ends of the runners 44 rearwardly abut the blade mounting plate 42 at the rearward termination of the runner slots 49 in this blade mounting plate, while the forward ends of these runners 44 project forwardly from the front bearing bar 37, as shown for instance in FIGS. 6, 7 and 8. Furthermore, these forward ends of the runners 44 are formed with the forwardly opening key slots 55, as can be clearly seen in FIG. 11, with these key slots receiving the front runner mounting key 46 extending laterally therethrough and removably secured abutting the front surface of the front bearing bar 37.

Thus, the runners 44 are confined in the knife plate 36 against longitudinal movement relative to the remainder of this knife plate by the blade mounting plate 42 rearwardly and the front runner mounting key 46 forwardly. Also, this key 46 prevents upward movement of the forward ends of the runners 44, and the blade mounting plate 42 and knife blade 43 prevent upward movement of the rearward ends of these runners.

Each of the runners 44 in its upstanding position projects upwardly preferably above the upper surfaces of the side members 41, as can be seen for instance in FIGS. 9 and 10. Furthermore, each of these runners 44 is formed with a sharpened upper edge 56 extending preferably substantially parallel to the main axes of the slide rods 34 and therefore substantially parallel to the path of travel of the knife plate 36 moving on these slide rods, and this sharpening may be produced by forming the upper side portions of each of these runners at an angle in the order of 25° from each side of a runner inwardly to the upper edge 56.

Still further it is preferred that the sharpened runner upper edges 56 of the runners 44 will extend the entire longitudinal length of each of these runners for producing optimum results. For reasonable functioning, however, as will be hereinafter more clearly understood, it is only required that such sharpening will extend along the runner upper edges 56 from spaced rearwardly of the cutting knife edge 53 on the knife blade 43 forwardly to at least spaced slightly forwardly of this cutting knife edge.

As can be clearly seen in FIGS. 4 through 7, it is likewise important to the principles of the present invention that the plane of the runner upper edges 56 will be spaced below the cutting knife edge 53 of knife blade 43, that is, the plane of the runner upper edges 56 will be spaced below a parallel plane passing through the cutting knife edge 53 of knife blade 43. As will be hereinafter more clearly understood, this clearance between the cutting knife edge 53 of knife blade 43 and the runner upper edges 56 forms the runner upper edges as a block positioning surface and will determine the thickness of the frozen meat chip cut from a frozen meat block position in the apparatus of the present invention, and for optimum results with the usual frozen meat block, it is preferred that this clearance will be in the order of 5/32 inch.

Also, in view of the lateral spacing of the longitudinally extending runners 44 and with these runners extending longitudinally between the cutting knife edge 53 of the knife blade 43 to the front bearing bar 37, it is seen that meat chip slots 57 are formed laterally between the runners and downwardly through the knife plate 36. Finally, as can be clearly seen in FIGS. 4, 6 and 9, the cutting chamber 24 of the apparatus of the present invention opens downwardly beneath the path of travel of knife plate 36 and particularly extending downwardly from the meat chip slots 57, with lower lateral flanges 58 extending longitudinally along the lower extremities of this cutting chamber serving as means for removably engaging the upper flange 59 on the meat chip container 25, so as to position this container removably supported beneath the cutting chamber and between the leg members 21.

As shown particularly in FIGS. 1 and 2, the top of the cutting chamber 24 is normally closed by a cover 60 hingedly connected to this cutting chamber and normally retained in closed position by usual fastening means 62, as shown. Mounted intermediate the cover 60 is the upwardly projecting feed hopper 23 which opens downwardly through a preferably rectangular feed opening 61 of the cover.

Important to the principles of the present invention is the fact that the feed hopper 23 is formed such that a frozen or semifrozen meat block retained therein will always be maintained positioned extending at an acute angle to the path of travel during the cutting stroke of the knife plate 36, that is, an angle less than 90° to the path of travel of the knife plate during the cutting stroke. As a practical matter, the degree of such acute angle will be determined by the length of meat chip desired and the length of cutting stroke of the knife plate 36 that can reasonably be provided in an apparatus of reasonable size, since the smaller the acute angle between the meat block and the path of travel of the knife plate 36 during the cutting stroke, the greater the length of this cutting stroke must be and the greater the length of the meat chips that will be provided.

In the preferred form of the feed hopper 23, the hopper is provided opening upwardly by the side walls 63, rear wall 64 and front wall 65, all of which are angled rearwardly at the acute angle desired to form a feed hopper 23 of generally rectangular cross-section. For convenience in inserting the frozen meat block 66 into the feed hopper 23 positioned as shown for instance in FIGS. 3, 6, 7 and 10, the front wall 65 extends upwardly only a limited distance from the cover 60, and this front wall forms a rearwardly angled inner abutment surface 67 against which the meat block 66 is resiliently urged by the leaf spring 68 on the inner side of the rear wall 64, to thereby retain the meat block in the acute angle position as described.

In the normally closed position, the cover 60 has an undersurface 69 spaced above the path of travel of the knife plate 36, and particularly spaced above the plane of travel of the cutting knife edge 53 on the knife blade 43. As shown for instance in FIG. 5, the front wall 65 of feed hopper 23 extends below this cover undersurface 69 so as to project downwardly therefrom and form at the lower extremity of this front wall, a laterally extending block holding edge 70 spaced closely above the plane of travel of the cutting knife edge 53 on knife blade 43. It is preferred that this clearance between the front wall block holding edge 70 and the plane of travel of the cutting knife 53 will be in the order of 1/32 inch to 1/8 inch, preferably about 3/32 inch, in order to insure proper cutting of the frozen meat block 66, and this becomes particularly important when the meat block is permitted to partially thaw so as to be only semifrozen at the time of cutting thereof.

Finally, the cover 60 is formed with the angled cover portion 71 overlying the forward portion of the pitman arm 32 and aligned with the slot 23 in the front wall 26 of the drive chamber 22. The obvious purpose of this angled cover portion 71 is to provide clearance for the movement of this pitman arm 32, while at the same time, maintain the same covered during operation and while the cover 60 is in closed position.

In operation of the apparatus of the present invention, the cover 60 is placed in closed position, as shown in FIG. 1, and a frozen or semifrozen meat block 66 is positioned in the feed hopper 23. Positioned in this manner, the lower end of this meat block extends downwardly through the feed opening 61 and rests on the block positioning surface formed by the upper edges 56 of the runners 44, that is, when the knife plate 36 is in rearward position as shown in FIG. 3. It will be noted that the feed opening 61 formed through cover 60 and forming the lower extremity of the feed hopper 23 is arranged such that the lower end of the meat block 66 must be aligned laterally with the runner slots 54 formed between the runners 44, that is, laterally between the side members 41 of knife plate 36, as shown in FIG. 10.

It will also be noted that this feed opening 61 is positioned such that the rearward extremity of movement of the knife plate 36 positions the cutting knife edge 53 of knife blade 43 rearwardly of the lower extremity of the feed hopper rear wall 64, and also positions the forward extremity of the knife plate 36, in this case determined by the forward extremities of the runners 44, spaced rearwardly of the block holding edge 70 on the feed hopper front wall 65, as shown in FIG. 7. Still further, it will be noted that this feed opening 61 is located such that the forward extremity of the forward or cutting stroke of the knife plate 36 will move the cutting knife edge 53 of knife blade 43 forwardly of the block holding edge 70 on the feed hopper front wall 65, as shown in FIG. 4 wherein this forward stroke extremity is being approached, and as shown in FIG. 5 wherein the forward extremity has been reached.

With the lower end of the frozen or semifrozen meat block resting or supported on the positioning surface formed by the upper edges 56 of the runners 44, the knife plate 36 moves longitudinally forwardly along the slide rods 34 in a cutting stroke. In the beginning, of course, the meat chips are cut merely from the lower rear corner portion of the meat block 66, but in short order, the full forwardly and rearwardly, or longitudinal dimension of the meat block is reached so that the meat block will ultimately rest fully on the knife plate 36 during the reciprocal movement of this knife plate.

As shown in FIG. 6, as the knife plate 36 moves longitudinally forwardly in the cutting stroke, meat chips are cut from the lower surface of the meat block 66 and are forced downwardly during such cutting by the cutting knife edge 53 of knife blade 43 through the meat chip slots 57 laterally between the runners 44. During this downward forcing of the meat chips over the sharpened upper edges 56 of the runners 44 and through the meat chip slots 57 between these runners, the meat chips are also simultaneously cut into laterally adjacent smaller meat chips, and ultimately fall downwardly through the cutting chamber 24 into the meat chip container 25.

The thickness of the meat chips cut from the lower end of the meat block 66 will, of course, be determined by the predetermined clearance between the block positioning surface formed by the sharpened upper edges 56 of the runners 44 and the cutting knife edge 53 of the knife blade 43, since the lower end of the meat block is slidably resting or supported on this block positioning surface, the cutting knife of the knife blade is cutting into the block, and at the same time, the block is being retained against forward movement by the inner abutment surface 67 on front wall 65 of feed hopper 23. Also, whether the knife plate 36 is moving forwardly or rearwardly, this meat block 66 is always urged forwardly toward this feed hopper inner abutment surface 67 by the leaf spring 68.

As can further be readily seen from FIG. 6, the important portions of the upper edges 56 of runners 44 which must be sharpened for a proper functioning of the combined cutting knife edge 53 and these runner upper edges, is in the location spaced rearwardly of to spaced forwardly of this cutting knife edge, since it is in this location that the main meat chip being cut from the meat block 66 by the cutting knife edge 53 is being forced by the tapered surface 51 on knife blade 43 and the tapered edge 48 on the blade mounting plate 42 downwardly against these sharpened runner upper edges 56, so that it is in this location that the main part of the cutting of the main meat chip into laterally adjacent parts is accomplished. By maintaining the entire longitudinal lengths of these runner upper edges 56 sharpened as is preferred, however, this secondary cutting of the main meat chip into laterally adjacent parts as the main meat chip is being forced downwardly through the meat chip slots 57 is more positively insured, since these runner upper edges during the cutting stroke of the knife plate 36, are always moving forwardly relative to the lower end surface of the meat block 66 and therefore can, during the early stages of the cutting stroke, initiate this secondary cutting and more completely insure that difficult meat sections, such as strings and tendons, will be competely severed.

It can likewise be seen that it is necessary to provide the rake 52 on the knife blade 43 in order to insure proper entrance of the cutting knife edge 53 of the knife blade initially into the meat block 66, while at the same time, preventing the meat block from merely riding upwardly in the feed hopper 23 which can frustrate a proper cut being initiated. Also, for these same reasons, the rake 52 on the knife blade 43 insures a continuation of the cut, after once initiated, of the desired general thickness.

As was hereinbefore stated, the thickness of the meat chip cut from the meat block 66 is determined by the clearance between the block positioning surface formed by the sharpened upper edges 56 of runners 44 and the cutting knife edge 53 of knife blade 43, but it should be kept in mind that where the meat block has become slightly thawed and is therefore only semifrozen, there is the possibility that the sharpened upper edges of the runners may slightly more greatly penetrate the lower surface of the meat block so that the meat chips may be slightly thicker.

In any event, as the runner 44 and knife blade 43 move forwardly in the cutting stroke, that is, the knife plate 36 moves forwardly relative to the meat block 66, the cutting knife edge 53 of knife blade 43 approaches the lower block holding edge 70 of the feed hopper front wall 65 and due to the relatively close clearance between this block holding edge 70 and the plane of the path of travel of the cutting knife edge 53, in almost all cases, the meat chip being cut will be relatively cleanly severed from the remainder of the meat block. Finally, this cutting knife edge 53 will pass completely beneath this block holding edge 70 and spaced forwardly thereof to the final position illustrated in FIG. 5, and at this time, the remainder of the meat block 66 will be resting on the upper surface of the blade mounting plate 42 on knife plate 36.

The knife plate 36 then immediately begins the longitudinally rearward stroke relative to the lower end of the meat block 66 with the blade mounting plate 42 and knife blade 43 of the knife plate ultimately moving longitudinally rearwardly of the lower end of this meat block, so that the meat block automatically drops downwardly until the lower end thereof comes to rest against the block positioning surface formed by the runner sharpened upper edges 56. This downward movement of the meat block 66 during this longitudinally rearward stroke of the knife plate 36 is automatic and occasioned by the gravitational force on the meat block and while the rearward angling of the feed hopper 23 continues to retain the meat block in the rearwardly angled position as described.

The importance of this rearwardly angled positioning of the meat block 66 is to retain the meat block in this self-fed position during the forward or cutting stroke of the knife plate 36 and so that a proper cut can be initiated and maintained. For instance, if the meat block 66 were retained at an angle of 90° or greater to the forward cutting stroke of the knife plate 36, as the cutting knife edge 53 of the knife blade 43 attempted to enter the meat block for the cutting of the meat chip during the cutting stroke, the meat block can move upwardly. Furthermore, this becomes progressively more critical as less and less of the meat block remains in the feed hopper 23, since the weight thereof becomes less and less.

Thus, in order to provide proper self-feeding of the meat block 66 in the feed hopper 23 including the proper retention thereof during cutting without special and complicated forced feeding means being provided, it is important that the meat block will be retained in this rearwardly angled position at an acute angle to the plane of travel of the cutting knife edge 53 of knife blade 43 during the forward cutting stroke of the knife plate 36.

Ultimately, as the cutting knife edge 53 of knife blade 43 reaches the rearward position in the longitudinally rearward movement of the knife plate 36, this knife blade cutting knife edge 53 will be rearward of the lower surface of the meat block 66, and preferably rearward of the lower extremity of the rear wall 64 on feed hopper 23, as shown in FIG. 7. Also, as is likewise shown in FIG. 7, at this time, the forward extremities of the runner sharpened upper edges 56 which form the block positioning surface will be spaced rearwardly of the block holding edge 70 on the feed hopper front wall 65 and therefore spaced rearwardly of the front edge of the meat block 66.

This will permit any remaining strings of meat occasioned by tendons and the like still clinging to the lower surface of the meat block to fall forwardly of the knife plate 36. This thereby more completely assures that the meat block 66 may move in its downward self-feeding action more fully onto the block positioning surface formed by the runner sharpened upper edges 56, while at the same time, in the initial phases of the forward cutting stroke of the knife plate, aids in completing the severing of the particular meat chip from the meat block.

In this manner and with the continuously following alternate forward cutting strokes and rearward return strokes in the reciprocal movement of the knife plate 36, all combined with the downward self-feeding of the meat block 66, the meat block is quickly and efficiently cut into a series of longitudinal meat chips which in turn are virtually simultaneously cut each into a series laterally adjacent meat chips, which drop downwardly through the meat chip slots 57 laterally between the runners 44 and into the meat chip container 25. Furthermore, due to the various features of construction as pointed out, such meat chip cutting will be quickly and efficiently accomplished despite the fact that the meat block 66 might be partially thawed so as to be only semifrozen, and despite the fact that the strings of meat occasioned by tendons and the like might be encountered.

Finally, in view of the hinge mounting of the cover 60 over the cutting chamber 24, when it is desired to clean the apparatus between meat chip cutting operations, it is merely necessary to release the fastening means 62 and swing the cover upwardly from the position shown in FIG. 1 to the position shown in FIG. 2. In this same position of this cover 60, the knife plate 36 is conveniently accessible for maintenance purposes, such as replacement of the knife blades 43 and runners 44, or other maintenance operations as required.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, the methods carried out, and the advantageous new and useful results obtained thereby, the new and useful construction and reasonable mechanical equivalents thereof, and the new and useful methods obvious to those skilled in the art are set forth in the appended claims.

I claim:

1. In meat chipping apparatus for cutting substantially frozen meat blocks and the like, a support frame, a rigid knife plate mounted for reciprocating movement longitudinally forwardly and rearwardly on the frame, means for reciprocating the plate, a knife blade rigidly mounted on the plate and having a cutting knife edge facing forwardly and extending generally laterally across the plate, the forward movement of the plate being a cutting stroke; block positioning surface means rigidly mounted on the plate spaced below and rigid relative to the knife blade cutting knife edge and extending generally longitudinally from a point spaced rearwardly to a point spaced forwardly of said cutting knife edge and forming a preset rigidly defined space between said surface means and said cutting knife edge; chip slot means formed downwardly through the block positioning surface means and extending forwardly from a point spaced rearwardly of the knife blade cutting knife edge for receiving meat chips downwardly therethrough cut by said cutting knife edge from a frozen meat block whose lower end is supported on the block positioning surface means and during the plate cutting stroke; hopper means mounted on the frame spaced from and extending upwardly from the path of movement of the plate for downwardly slidably positioning such frozen meat block to extend at an acuate angle relative to forward plate movement during the cutting stroke, forward surface means on the hopper means constructed and arranged for abutment by such frozen meat block at least during forward plate cutting stroke movement for resisting forward movement of such frozen meat block and for maintaining such frozen meat block extending at an acute angle during plate cutting stroke movement; the reciprocating movement of the plate moving the cutting knife edge from a point spaced rearwardly to a point spaced forwardly of the lower end of such frozen meat block supported on the simultaneously moving block positioning surface means during plate cutting stroke movement; at least a part of said block positioning surface means being formed by the upper edges of at least two laterally spaced and generally longitudinally extending runner members; the runner member upper edges being sharpened at least from a point spaced rearwardly to a point spaced forwardly of the knife blade cutting knife edge; and the lateral spacing of the runner members forming at least a part of the chip slot means downwardly through said block positioning surface means.

2. Meat chipping apparatus as defined in claim 1 in which the knife blade is formed with a rake extending from the cutting knife edge to a point spaced rearwardly of said cutting knife edge; and in which the knife blade rake is formed at the top of said blade and opposite the block positioning surface means so that the cutting knife edge projects angularly away from the block positioning surface means and the path of travel of the knife plate.

3. Meat chipping apparatus as defined in claim 1 in which substantially the entire block positioning surface means is formed by the upper edges of said runner members; in which the runner member upper edges are sharpened substantially throughout their entire longitudinal extent; and in which the lateral spacing of the runner members forms substantially the entire chip slot means downwardly through the block positioning surface means.

4. Meat chipping apparatus as defined in claim 1 in which the hopper forward surface means includes a laterally extending surface extending at an acute angle relative to knife plate forward cutting stroke movement; in which the forward laterally extending surface terminates in a block holding edge spaced from and closely adjacent to the path of movement of the knife plate and the knife blade cutting knife edge; in which substantially the entire block positioning surface means is formed by the upper edges of the runner members; in which the runner member upper edges are sharpened substantially throughout their entire longitudinal extent; in which the lateral spacing of the runner members forms substantially the entire chip slot means downwardly through the block positioning surface means; and in which the means for reciprocating the knife plate moves the plate rearwardly prior to each knife plate cutting stroke to a rearward position in which the forward extremities of the runner members which form the block positioning surface means are spaced rearwardly of the block holding edge on the forward surface means.

5. Meat chipping apparatus as defined in claim 1 in which resilient positioning means is mounted in the hopper means for resiliently urging a frozen meat block into abutment with the forward surface means at least during forward plate cutting stroke movement.

References Cited

UNITED STATES PATENTS 2,051,352   8/1936   Taylor _____ 146—151
3,167,102   1/1965   Vinette _____ 146—151 X DONALD R. SCHRAN, *Primary Examiner.*